(No Model.) 2 Sheets—Sheet 2.

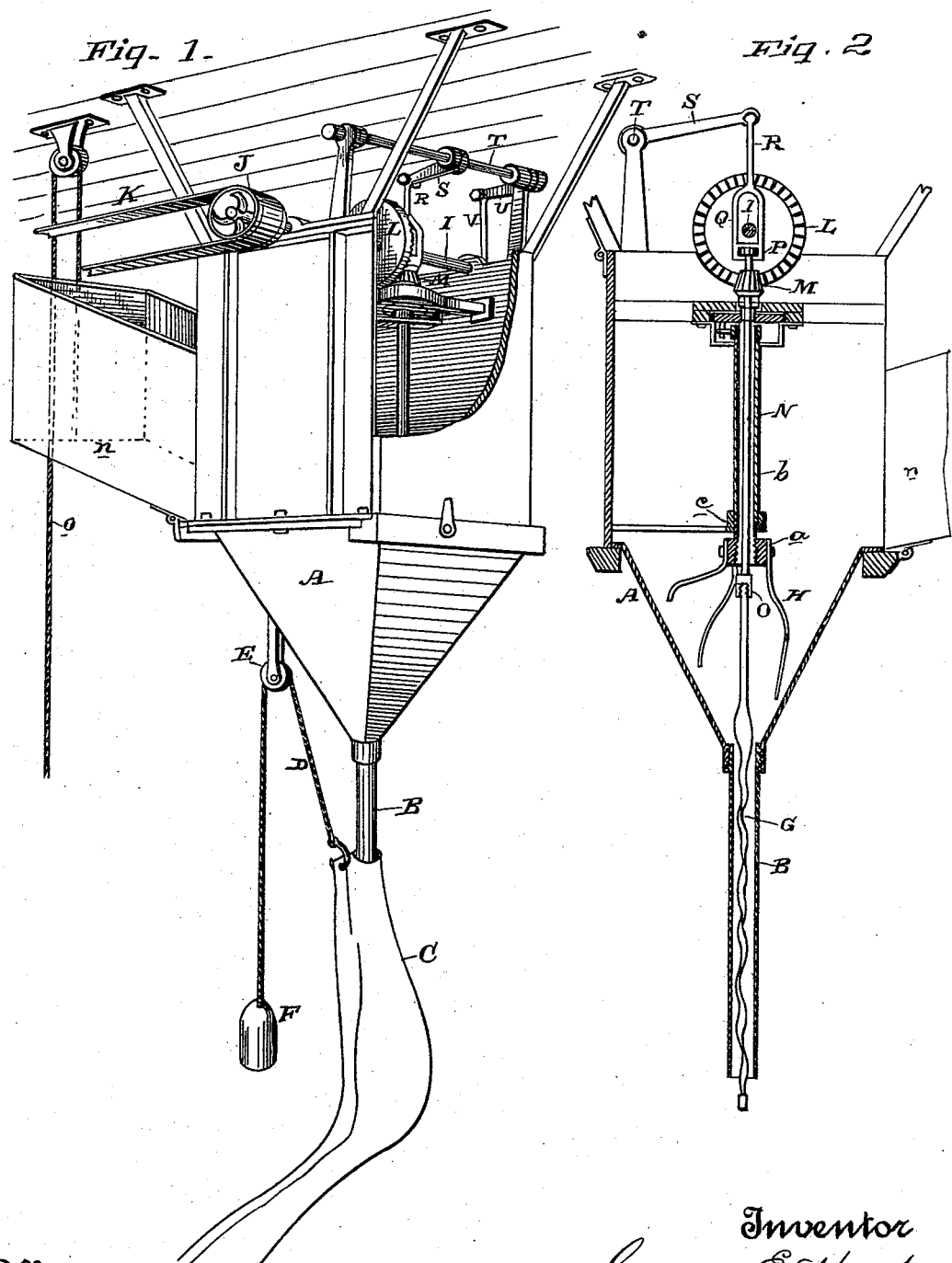

G. E. HOYT.
COLLAR STUFFING MACHINE.

No. 417,560. Patented Dec. 17, 1889.

Witnesses:
Geo. H. Strong

Inventor,
George E. Hoyt
By Dewey & Co.
atty

UNITED STATES PATENT OFFICE.

GEORGE E. HOYT, OF SAN FRANCISCO, CALIFORNIA.

COLLAR-STUFFING MACHINE.

SPECIFICATION forming part of Letters Patent No. 417,560, dated December 17, 1889.

Application filed August 27, 1889. Serial No. 322,164. (No model.)

*To all whom it may concern:*

Be it known that I, GEORGE E. HOYT, of the city and county of San Francisco, State of California, have invented an Improvement in Collar-Stuffing Machines; and I hereby declare the following to be a full, clear, and exact description of the same.

My invention relates to a machine which is intended to stuff the bodies of horse-collars with straw or filling, by which they are properly shaped.

It consists of a vertical hopper, a rotary and reciprocating auger, by which the filling material is forced into the collar, and a mechanism by which the double motion of the filling-auger is produced, and by which the material is properly stirred and loosened up, together with certain details of construction, all of which will be more fully explained by reference to the accompanying drawings, in which—

Figure 3:
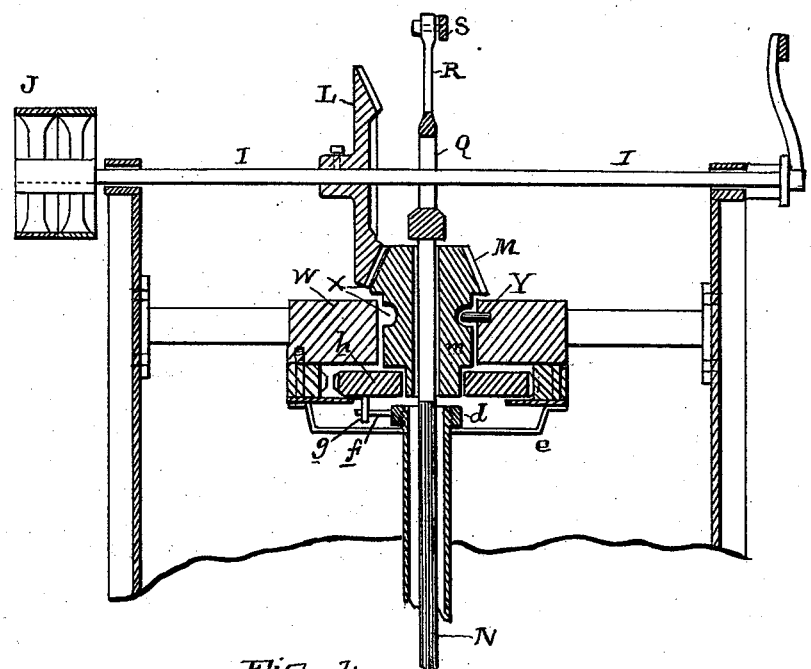
Figure 4:
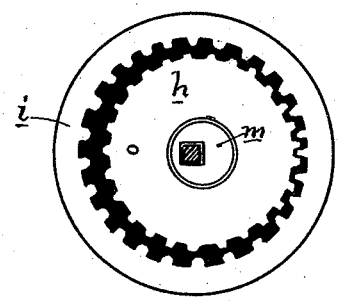

Figure 1 is a perspective view of my apparatus, a part of one side of the hopper broken away to show the interior. Fig. 2 is a vertical section taken through the hopper at right angles with the horizontal driving-shaft. Fig. 3, Sheet 2, is an enlarged vertical section of the upper part of the hopper, showing the gearing by which the stirrers are operated. Fig. 4 is a plan view of the gearing alone.

This invention is applicable to that class of machines in which a vertical hopper A is employed having a tube B extending from the lower end, upon which the flexible leather tube C is slipped, so as to be filled with straw or other material, and thus shaped into the form of a collar. This tube C is held in place by means of a cord D, passing over a pulley E, and having a counter-weight F sufficient to hold it up, but at the same time to allow it to gradually move down as the filling is completed. This filling is effected by means of a spiral rod or auger G, which is caused to rotate and at the same time is given a vertical reciprocating motion within the tube B and the hopper. The material within the hopper is at the same time stirred and agitated, so as not to become clogged, by means of the arms H, which are slowly revolved within the hopper.

My present invention relates to mechanism for actuating these parts.

I is a horizontal shaft extending across the upper part of the hopper A, and upon one end is a pulley J, around which passes a belt K from the source of power, and by this means the shaft I is rotated. Upon this shaft I is fixed a beveled gear-wheel L, and this engages with a pinion M on the upper end of the auger G or an extension-shaft N, which is united to it by a suitable coupling and extends up to the upper part of the hopper, as shown. I prefer to use this coupling instead of making the whole in one piece, so that when the auger becomes worn or in any way disabled it may be easily uncoupled and replaced without removing the other portions of the apparatus.

The upper end of the rod N has a head P, which extends up through the lower part of a yoke Q, and is allowed to turn loosely around in a socket in which it lies, but it may at the same time receive a vertical motion. This is effected without moving the pinion M by fitting this pinion loosely upon the shaft N, which is made square, and so that it may slide through the pinion to produce a reciprocating motion, while the pinion transmits a rotary motion to the shaft. The latter receives its vertical motion as follows: The link or yoke Q is made to stand astride of the shaft I, and is long enough to allow the necessary vertical movement for stuffing purposes. The upper end of this link or yoke has an extension R, by which it is connected with a rocker-arm S, which is fixed to a shaft T, journaled above the hopper, as shown. Upon the outer end of this shaft is another rocker-arm U, which is connected by a pitman V with a crank-pin at the outer end of the shaft I, and through this a rocking motion is communicated to the shaft T, and through that a reciprocating motion, by which the rod N is caused to rise and fall, at the same time being rotated by the gears L and M, as above described. The gear M has a hub extending down through the plate W, and having a groove or channel X formed in it, which the pin or projection Y fits, and this prevents the pinion from rising and falling with the motion of the rod N.

In order to rotate the stirrers H, they are secured to a head $a$ upon a tube $b$, which extends down around the shaft N. This tube has its lower end supported in a journal-box $c$, which allows it to turn. The upper end has a head $d$, turning within a yoke $e$, and having a pin $f$, projecting from one side of it, which is engaged by another and vertical pin $g$, projecting downwardly from a gear-wheel $h$. This gear-wheel lies within a fixed internal gear $i$, which is of larger diameter than the gear-wheel $h$ and contains more teeth. The teeth of the two gears, however, are adapted to mesh with each other, and the interior gear $h$ is fitted upon an eccentric extension $m$ at the bottom of the hub of the pinion M. This eccentric turns with the pinion M, and simply acts to move every portion of the circumference of the gear $h$ successively into contact with the teeth of the stationary surrounding internal gear $i$. As the gear $h$ has one or more teeth less than its surrounding gear $i$, it will be manifest that at the completion of each circuit which the gear $h$ makes within the gear $i$ it will have fallen behind in rotation a distance equal to the difference in the number of teeth, and by this it will slowly rotate the sleeve $b$, and with it the stirrers H, moving them backward with just sufficient rapidity to prevent the straw or filling from becoming clogged within the hopper.

The hopper is filled with a suitable material for stuffing the collars, and a second hopper $n$ is hinged to the side of it, having a rope $o$ passing over a pulley and connected with it, and extending down to a point within reach of the operator, so that whenever the hopper A is becoming emptied of material by raising the outer end of the swinging hopper $n$ its contents may be discharged into the hopper A without stopping work.

Having thus described my invention, what I claim as new, and desire to secure by Letters Patent, is—

1. In a collar-stuffing machine, a vertical hopper and a rotary reciprocating auger, a tube extending downward from the hopper and adapted to receive the collar-tube which is fitted over it, in combination with a pinion through which the auger-driving rod extends, a gear-wheel mounted upon a horizontal shaft engaging said pinion, so as to produce a rotary motion thereof, a yoke in which the head of the auger-driving rod is swiveled, and a rocker-shaft and rocker-arms connected directly with the yoke, whereby a vertical reciprocating motion is transmitted to the auger, substantially as described.

2. In a collar-stuffing machine, a containing-hopper, the horizontal shaft extending across the upper part, a gear-wheel fixed upon said shaft within the hopper, and a crank-wheel upon the outer end, a pinion with which said gear-wheel meshes, a rod carrying the stuffing-auger, which projects into a tube at the bottom of the hopper, said rod being square and extending through a pinion by which it is caused to rotate, and having a head swiveled within a yoke, and a second shaft journaled upon the hopper above the first-mentioned one and having rocker-arms, one of which is connected with the crank-wheel upon the first shaft and the other with the yoke, whereby the latter is reciprocated so as to give the auger a vertical motion while it is rotated by the gear and pinion, substantially as described.

3. In a collar-stuffing machine, a containing-hopper having an extension-tube, a reciprocating auger, and a power-shaft having a gear, a rotary pinion M, having the eccentric at its lower end, a gear-wheel fitting loosely around said eccentric and capable of being moved around in a circle by the throw of the eccentric, an internal gear surrounding the first-mentioned gear-wheel, having teeth that mesh with it and having a diameter sufficiently larger to allow the interior gear to travel around within it, a pin connecting said interior gear with a sleeve surrounding the extension of the collar-stuffing rod, and arms connected with the ends of this sleeve and receiving motion from the gear and sleeve, substantially as described.

In witness whereof I have hereunto set my hand.

GEORGE E. HOYT.

Witnesses:
S. H. NOURSE,
H. C. LEE.